US006980985B1

(12) United States Patent
Amer-Yahia et al.

(10) Patent No.: US 6,980,985 B1
(45) Date of Patent: Dec. 27, 2005

(54) DISTRIBUTED EVALUATION OF DIRECTORY QUERIES USING A TOPOLOGY CACHE

(75) Inventors: Sihem Amer-Yahia, New York, NY (US); Divesh Srivastava, Summit, NJ (US); Dan Suciu, Seattle, WA (US)

(73) Assignee: AT&T Corp., New York, NY (US)

( * ) Notice: Subject to any disclaimer, the term of this patent is extended or adjusted under 35 U.S.C. 154(b) by 624 days.

(21) Appl. No.: 09/941,479

(22) Filed: Aug. 29, 2001

Related U.S. Application Data (60) Provisional application No. 60/228,928, filed on Aug. 30, 2000.

(51) Int. Cl.[7] .............................................. G06F 17/30
(52) U.S. Cl. .................. 707/4; 707/2; 707/7; 707/8; 707/9
(58) Field of Search .................. 707/1–10, 100–104.1, 707/200–206; 709/212–229; 711/111–118

(56) References Cited

U.S. PATENT DOCUMENTS

| | | | | |
|---|---|---|---|---|
| 5,948,063 A | * | 9/1999 | Cooper et al. | 709/223 |
| 6,457,047 B1 | * | 9/2002 | Chandra et al. | 709/217 |
| 6,490,589 B1 | * | 12/2002 | Weider et al. | 707/100 |
| 6,597,684 B1 | * | 7/2003 | Gulati et al. | 370/351 |

OTHER PUBLICATIONS

Berchtold, Stefan; Biliris, Alexandros, Panagos, Euthimios, "Save me:a system for Archiving Electronic Documents Using Messaging Groupware", AT&T Labs Research, Florham Park NJ, In proceedings of International Joint Conference on Work Activities Coordinations and Collaboration (WACC) San Francisco CA Feb. 1999.

Ives, Zachary; Florescu, Daniela; Friedman, Marc; Levy, Alon; Weid, Daniel "An Adaptive Query Execution System for Data Integration", Oct. 30, 1998. In proceedings of the ACM SIGMOD Conference on Management of Data, pp. 299-310, Philadelphia, Pa, Jun. 1999.

Bernstein, Philip A.; Goodman, Nathan, "Power of Natural Semijoins" SIAM Journal of Computing, 10 (4):751-771, Nov. 1981.

Mullin, James K. "Optimal Semijoins for Distributed Database Systems", IEEE Transactions on Software Engineering 16 (5) 1990.

* cited by examiner

*Primary Examiner*—Jean M. Corrielus
*Assistant Examiner*—Isaac M. Woo

(57) ABSTRACT

A technique for performing query evaluation on distributed directories utilizes the creation of a "topology cache" defining the hierarchical relationship between the various directory servers (i.e., identifying "subordinate" and "superior" knowledge references associated with each directory server in the system). The created topology cache is then stored at each directory server, and forwarded to a client upon submitting a query to the system. Using the topology cache information at the client, a distributed query evaluation plan can be developed for use with complex queries, such as hierarchical and aggregate queries.

16 Claims, 6 Drawing Sheets

```
Alogorithm Schedule(PT) {
    Answer:= { }; Pending := { }; Enabled := { };
    for each n in leaves(PT) do computeQueryNode(n);
    while (Enabled ≠ { } OR Pending ≠ { })
        L := chooseForSchedule(Enabled); /* implements a particular scheduling policy */
        for each (Q,S) in L do
            Pending := Pending ∪{(Q,S)}; LDAP_issueQuery(Q,S);
        LDAP_waitForEvent(e);
        case e.type of
            boolean answer for Q@S: Pending := Pending -{(Q,S)}
                                    storeCache(Q,S,e.value);
                                    for n in getCacheWaitinglist(Q,S) do {
                                        n.value := e.value;
                                        computeConditionalNode(n.parent); }
            directory entry for Q@S: Answer := Answer ∪{e.value}
            End-of-Entries for Q@S: Pending := Pending -{(Q,S)}
    return Answer;
}
function computeQueryNode(n) {
    if all n's children are computed then
        Q := generateQueryExpression(n.Query); /* expands all if-macros*/
        S := n.Server; v := getCache(Q,S);
        case v of
            INEXISTENT:     insertCache(Q,S, Pending);
                            Enabled := Enabled ∪{(Q,S)};
                            addCacheWaitingList(Q,S,n);
            Pending         addCacheWaitingList(Q,S,n);
            TRUE, FALSE:    n.value := v ;
                            computeConditionalNode(n.parent)
}
function computeConditionalNode(n) {
    if (exist p in n.children such that p.value = TRUE) then
        n.value := TRUE; computeQueryNode( .    );
    else if (all n's children are computed) then
        n.value := FALSE; computeQueryNode(n.parent);
}
```

DISTRIBUTED EVALUATION OF DIRECTORY QUERIES USING A TOPOLOGY CACHE

CROSS REFERENCE TO RELATED APPLICATION

This application claims the priority of Provisional Application Ser. No. 60/228,928, filed Aug. 30, 2000.

TECHNICAL FIELD

The present invention relates to performing queries in various database structures and, more particularly, to utilizing a topology cache, stored at each server, to improve the search efficiency.

BACKGROUND OF THE INVENTION

A directory service is the central point where network services, security services and applications can inform other entities in the network about their services, thus forming an integrated distributed computing environment. With more and more applications and system services demanding a central information repository, the next generation directory service will need to provide system administrators with a data repository that can significantly ease administrative burdens. In addition, the future directory service must also provide end users with a rich information data warehouse that allows them to access department or company employee data, as well as resource information, such as name and location of printers, copy machines, and other environment resources. In the Internet/intranet environment, it will be required to provide user access to such information in a secure manner.

To this end, the Lightweight Directory Access Protocol (LDAP) has emerged as an Internet Engineering Task Force (IETF) open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model, in particular, is based on an "entry", which contains information about some object. Entries are typically organized in a specified tree structure, and each entry is composed of attributes.

LDAP provides the capability for directory information to be queried or updated. However, current LDAP implementations support only Boolean queries, which are too limited for many of the current applications. For example, in a DEN (Directory Enabled Network) application, an LDAP query cannot be used to identify the highest priority network management policy in the directory that matches a given profile. To retrieve such information, DEN applications would have to specify not only which directory entries need to be accessed, but also how to access them, using long sequences of LDAP queries—an undesirable alternative.

Many of the new generation of directory applications will require the use of richer query languages that include hierarchical and aggregate selection queries that can be efficiently evaluated (in terms of linear time and I/O complexities) in a centralized directory. For the most part, the newer directories are distributed in nature, where the data is stored on a collector of autonomous directory servers. While such an arrangement allows for conceptual unity, the distributed directory architecture is not well-supported by conventional relational and object-oriented database.

The conceptually unified nature of distributed directories encourages the use of queries without having to be aware of the location of individual directory entries. It is the task of the directory servers and the directory client (which mediates between the user and the servers) to evaluate these queries in a distributed fashion. Distributed evaluation of LDAP (i.e., Boolean) queries is currently performed using the "referral" mechanism, where a server can return references to a client identifying other servers that may contain answers to the query. Thus, distributed query answering does not involve server-to-server communication, which can consume considerable server resources, especially when simultaneously processing thousands of user queries. There are, however, some disadvantages associated with the referral mechanism. Most importantly, if a directory server becomes unavailable, it can create "islands" of directory servers that are disconnected from each other. Even in the circumstance where all servers are available, distributed query evaluation requires a sequence of client-server interactions, involving multiple servers, which can be quite inefficient, especially when the director server topology has long paths.

Thus, a need remains in the art for an improved scheme for query evaluation in directories in a distributed environment, and which can support complex hierarchical and aggregate queries, as well as the simpler LDAP Boolean queries.

SUMMARY OF THE INVENTION

The need remaining in the prior art is addressed by the present invention which relates to performing queries in various database structures and, more particularly, to utilizing a topology cache, stored at each server, to improve the search efficiency.

In accordance with the present invention, a topology cache is formed, which describes the forest-structured (distributed) topology of the directory servers, and consists of a set of knowledge references (defining "subordinate" and "superior" directory servers), one reference for each physical directory server in the distributed topology of directory servers. Each directory server is required to store a copy of the topology cache.

An LDAP directory evaluation using the topology cache of the present invention thus consists of the steps of: (1) the LDAP client obtaining the entire topology cache from the directory server specified by the user; (2) the LDAP client analyzing the topology cache and determining all (and only all) of the relevant servers that can contain query results; (3) independently sending the original query to the directory server that manages the query's base-entry-DN, and modified queries (the base-entry-DN and the scope may be modified, the filter is not) to the other relevant servers; and (4) combining, at the LDAP client, the local results returned by each contacted server.

It is an aspect of the present invention that the use of a topology cache can allow for more complex directory queries than the LDAP Boolean queries. In particular, the use of the cache topology allows for multiple base-entry-DNs, hierarchical queries, and aggregate selection queries, where the topology cache is exploited to generate efficient distributed plans. In instances where the query includes existential queries, the node identity related to these queries can first be cached and then responded to in the development of a distributed query evaluation plan.

Other and further aspects of the present invention will become apparent during the course of the following discussion and by reference to the accompanying drawings.

BRIEF DESCRIPTION OF THE DRAWINGS

Referring now to the drawings,

FIG. 1 illustrates an exemplary distribution topology of directory entries in a conceptually unified directory information forest (DIF), where

FIG. 2 illustrates the experimental results from using the topology cache to aid in query evaluation, when compared to prior art "no cache" queries, for both "left deep" topologies (FIG. 2(a)) and "balanced topologies" (FIG. 2(b));

FIG. 7 illustrates the scalability of distributed evaluation of hierarchical queries, comparing the prior art "no existential cache" case of FIG. 7(a) to the "existential cache" case of FIG. 7(b).

DETAILED DESCRIPTION

In order to fully appreciate the utilization of a topology cache in association with the distributed evaluation of directory queries, it is useful to review the concepts involved with the directory data model as used herein.

Just as the relational model uses relations as a single uniform data structure, the directory model uses a "forest" as a single data structure. Nodes of the forest are defined as "directory entries", where each entry "r" has a distinguished name dn(r), holds information in the form of a set of (attribute, value) pairs val(r), and belongs to a non-empty set of object classes class(r). An entry may have multiple values for an attribute, e.g., telephoneNumber; in particular, the object classes that entry r belong to are precisely the (multiple) values of r's objectClass attribute. The distinguished name dn(r) is defined as a sequence $s_1, s_2, \ldots, s_n$ of sets of (attribute, value) pairs. The first set, $s_1$, in the sequence is defined as the "relative distinguished name" of r, and is denoted by rdn(r). Distinguished names must satisfy the following conditions: (i) for all directory entries r,r': r≠r'⇒dn(r)≠dn(r'), that is, dn must be a key of each directory entry; and (ii) rdn(r)⊆val(r). Distinguished names naturally induce a hierarchical namespace among directory entries. That is: (a) entry r is a "parent" of entry r' if dn(r')=rdn(r); entry r' is thus said to be a child of entry r; (b) entry r is an "ancestor" of entry r' if there exists sets of (attribute, value) pairs $s_1, s_2, \ldots s_m$ such that dn(r')=$s_1, S_2, \ldots, s_m$, dn(r); entry r' is then defined as a "descendant" of r. Hereinafter, this hierarchical organization will be referred to as the "directory information forest" (DIF). The hierarchical directory namespace typically corresponds to administrative responsibilities for portions of the namespace, and may reflect, for example, political, geographic and/or organizational boundaries. Different network operators or large businesses can own portions of the namespace and operate their own directory servers for their part of the namespace. This is very similar to the way the Domain Name System (DNS) operates, which allows maintenance of its (hierarchical) namespace in a distributed fashion, and provides rapid lookups in the namespace.

Figure 1A:
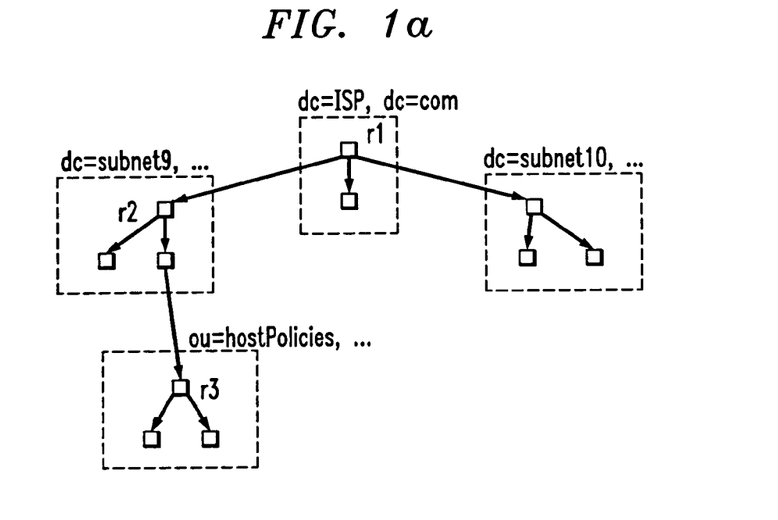
FIG. 1(a) illustrates the distribution among multiple directory partitions and FIG. 1(b) illustrates the superior and subordinate knowledge references that link the different partitions.
Figure 1B:
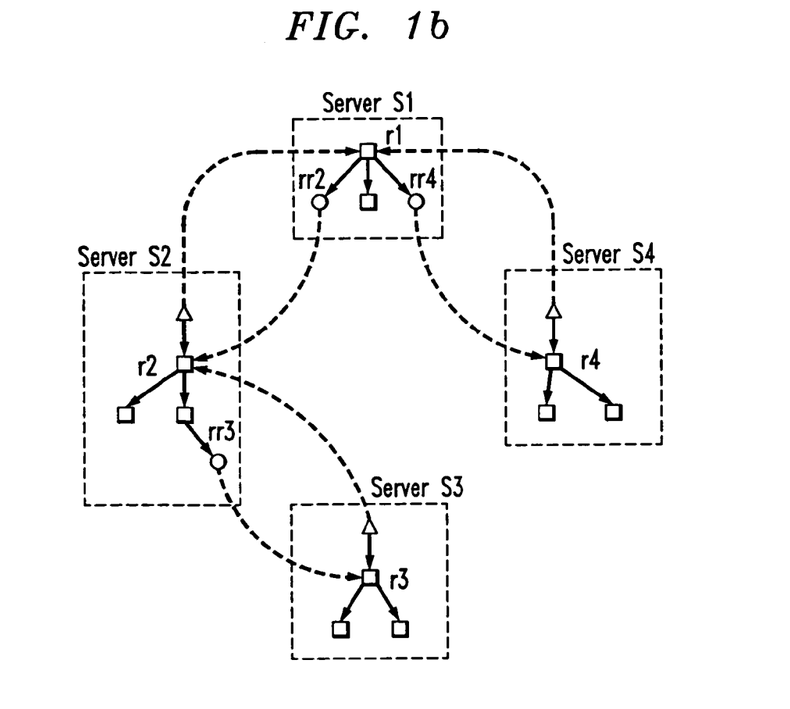

The hierarchical namespace induced by the distinguished names of directory entries allows a natural mechanism for "distribution", in which the entries are partitioned across multiple physical directory servers. This distribution is hidden from the user who is presented with the directory information forest (DIF) as a conceptually unified view of the directory data. Intuitively, a "directory partition" is a complete sub-forest of the DIF, excluding any of its sub-forests that are held within other "lower" partitions. FIG. 1(a) illustrates how the directory entries in a conceptually unified DIF can be distributed among multiple directory partitions, as indicated by the dashed rectangles. The directory partitions are themselves hierarchically related, and the relationships between them are achieved via "superior" and "subordinate" knowledge references, which are pointers to directory data held in higher and lower partitions, respectively. FIG. 1(b) illustrates the superior and subordinate knowledge references, using triangles to denote the superior knowledge references and circles to denote the subordinate knowledge references.

For the sake of simplicity, it will be presumed that each directory partition is managed by a separate physical directory server, although in principle a physical directory server can manage multiple partitions. Superior and subordinate knowledge references are modeled in a physical directory server as entries belonging to the object class referral. Referral entries contain the LDAP URL of the higher or the lower directory server as value of the ref attribute. The LDAP URL includes the name and port number of the server, along with the dn of the partition root of the directory server, and has the form 1dap://ds10.ISP.com:389/dc=ISP, dc=com. A subordinate referral entry in a directory server points downward in the DIF, and has the same dn as the partition root of the child directory server, where a superior referral entry in a directory server points upward in the DIF, and has the same dn as the parent entry of the partition root of the given directory server. It is to be noted that although referral entries in a directory server are part of the physical DIF represented at that server, they are not part of the conceptual DIF presented to the user.

An LDAP query consists of a base entry DN, a search scope, and a filter. Atomic LDAP filters can compare individual attributes with values, perform approximate matching of attributes with values, test for the presence of an attribute, or do substring (for example, "initial", "any", or "final") comparisons with the value of an attribute. Atomic LDAP filters can be combined using the standard Boolean operators: and (&), or (|), not (!), in a parenthesis-prefix notation, to form complex LDAP filters. The applicability of the LDAP filter in the directory information model can be restricted in two ways: using a base entry DN and a scope. The "base entry", specified by its distinguished name, is the entry relative to which the filter is to be evaluated. The "scope" indicates whether the filter is to be evaluated only at the base entry (base), only at the children of the base entry (one), or down to all descendants of the base entry (sub). A general LDAP query can be represented using the following syntax:

base-entry-DN ? scope ? filter

A query returns a sequence of zero or more responses, each consisting of an entry found during the search, containing all attributes, complete with the associated values. From the database point of view, this is analogous to a selection query. For example, the query dc=ISP, dc=com ? sub ? (& (SLAPriority<=2) (objectClass=SLAPolicy))

would match all policy rules in the ISP.com network with a priority of 2 at the most.

LDAP queries are evaluated in a distributed directory by "walking" up and down the partitions managed by the physical directory servers, and evaluating the filter against each relevant partition. To answer the query submitted by an LDAP client, the distributed directory uses "superior" and "subordinate" knowledge references to assist the client in determining all of the servers that need to be contacted to fulfill this request. The referral entries to these other servers that need to be contacted are returned to the client, which then resubmits the original query to these other servers. Thus, the distribution is exposed to the LDAP client that decides whether or not to continue the processing of a query that spans multiple servers. This mechanism is known as "distributed evaluation by referrals", where an example is discussed below, illustrating the steps involved in the distributed evaluation by referrals of the LDAP query Q, defined as follows:

dc=subnet9, dc=ISP, dc=com ? sub ? (objectClass=SLAPolicy), where for the purposes of the present discussion, it will be presumed that this query was submitted to server S4 of FIG. 1(b). In particular, the following steps are performed in the evaluation:

(1) Client submits query request Q to server S4. Since server S4 does not manage the base-entry-DN dc=subnet9, dc=ISP, dc=com, it consults its superior knowledge reference, and sends a referral to server S1 to the client.

(2) Client submits query request Q to server S1. Server S1 does not manage the base-entry-DN either, but it does contain a subordinate knowledge reference for a relevant partition, so it sends a referral to server S2 to the client.

(3) Client submits query request Q to server S2. Server S2 verifies that the base entry exists in its partition. It then searches its partition for matching entries, and returns the results to the client.

(4) Server S2 also discovers that it has a subordinate knowledge reference to server S3, which may also contain matching results. Server S2 then sends a referral to server S3 to the client.

(5) Client modifies the base-entry-DN of query Q to the partition root r3 of server S3, and submits the modified query request to server S3. Server S3 verifies that the (modified) base entry exists in its partition, and searches its partition for any matching entries, returning the results to the client. No additional subordinate references exist, so no further referrals are returned.

(6) Client combines the results from server S2 and server S3, and returns them to the user.

The mechanism of distributed evaluation by referrals, as discussed above, is based on the LDAP philosophy that the distribution logic must be provided by the LDAP client. This avoids inter-server communication during query processing. One advantage of this mechanism is that each directory server needs only to be aware of the servers in its local vicinity: its parent server and its children servers. However, there are some major disadvantages of utilizing "distributed evaluation by referrals". Indeed, if a directory server becomes unavailable, it can create "islands" of directory servers that are disconnected from each other. For example, assume that server S1 in FIG. 1(b) is unavailable, while all other servers are available. Then, when the above-described LDAP query Q is submitted to server S4, the results of the query cannot be returned to the client, even though both servers S2 and S3, which contain these results, are available. The problem is that server S4 does not "know" about server S2, but only the (unavailable) server S1 on the path from server S4 to server S2.

Additionally, distributed query evaluation, even when all of the servers are available, requires a series of client-sequence interactions, involving multiple servers, which can be quite inefficient, especially when the directory server topology has long paths. Looking at the above example, the original submission of the LDAP query Q to server S4 requires the client to contact, in turn, server S1, followed by server S2, followed by server S3. Of these, the interaction with server S1 is essentially useless, since it cannot contain any answer to the query. If the base-entry-DN had been r3, managed by server S3, the interactions with both servers S1 and S2 would also have been useless. Again, the problem is that server S4 does not "know" about the existence of servers S2 and S3, which manage the base-entry-DNs of query Q.

With this background and a full understanding of distributed query evaluation using referrals, it is now possible to better understand the subject matter of the present invention and the utilization of a topology cache to improve the efficiency of a distributed query evaluation. In accordance with the present invention, a "topology cache" describes the forest-structured topology of the directory servers, and comprises a set of knowledge references, one for each physical server in the distributed topology of directory servers. It is an aspect of the present invention that each directory server is required to store a copy of the topology cache. Thus, for an LDAP query, the evaluation of a query Q using the topology cache method of the present invention would proceed as follows:

(1) The LDAP client obtains the entire topology cache from the directory server specified by the user;

(2) The LDAP client analyzes the topology cache and determined all (and only all) relevant servers that can contain query results;

(3) The LDAP client independently sends the original query to the directory server that manages the query's base-entry-DN, and sends modified queries (the base-entry-DN and the scope may be modified, the filter is not) to the other relevant servers; and (4) The LDAP client combines the local results returned by each contacted server to give to the user.

Thus, referring to FIG. 1(b), a topology cache would contain information about all four servers, and the above-described query Q would proceed through the topology cache method as follows:

(1) The LDAP client obtains the entire topology cache from server S4;

(2) The LDAP client analyzes the topology cache and determines that only servers S2 and S3 are relevant;

(3) The LDAP client independently sends the original query Q to server S2 and the query with the base-entry-DN modified to server S3's partition root r3 to server S3 (referred to hereinafter as $Q_{S3}$);

(4) The LDAP client then combines the results from servers S2 and S3.

As will be discussed below, these steps as outlined above are defined as a "distributed query evaluation plan", $P_Q$, which is expressed algebraically as follows:

$$P_Q = Q@S2 \cup Q_{S3}@S3$$

An advantage of using the topology cache system of the present invention is that the non-availability of one or more servers (as in the above example when server S1 is unavailable) does not affect the answer to the query. Further, no irrelevant servers are contacted to answer the user query (except for S4, which is the only server known to the client). Thus, for simple LDAP queries, the mechanism of distributed evaluation using the topology cache mechanism of the present invention allows for only relevant servers to be contacted, and exploits the maximum parallelism among the servers. Further, this mechanism adheres to the LDAP philosophy that the distribution logic must be provided entirely by the LDAP client, without burdening the servers with managing inter-server communication during query processing.

There are two main concerns associated with the concept of a topology cache that have heretofore negated its use in association with database queries: "consistency" and "cost". In particular, maintaining consistent caches in a distributed environment is considered expensive in terms of the constant need for update and control. However, this in only true when the frequency of change propagation is high, that is, either the cached data changes frequently, or the number of (slowly changing) entries in each cache is very large. In the present context of directory queries, neither of these conditions is valid. That is, while the data in each in directory may change often, the topology of the directory servers rarely changes; the servers are linked, created and/or removed only occasionally. Since the topology cache as used in the present invention only contains the topology information in terms of subordinate and superior knowledge references (and not detailed information about the contents of each directory server), the cached data changes infrequently, too. Further, the number of directory servers is likely to be in the range of tens or hundreds, hence the number of entries in the topology cache will be in the same range.

For user queries whose answer is small (one, or a few directory entries), fetching and examining the entire topology cache is a considerable overhead. However, these costs can be amortized over multiple queries in a single client-server session. That is, the topology cache needs to be fetched only once at the beginning of each session, and all of the user queries in that session can use the fetched topology. Further, the knowledge references in the topology cache can be pre-processed into a trie structure, mirroring the forest of physical directory servers. This enables very efficient determination of the particular servers that are relevant to the current query, based on the observations that: (a) the task of finding the server that manages the base entry of the query is akin to finding the string (in a database of strings) that is the longest prefix of a given query string; and (b) all other relevant servers are located in the subtree below the server that manages the base entry of the query.

FIG. 2 illustrates experimental results from utilizing the topology cache of the present invention, when compared to a prior art distributed directory query using the "referral" method discussed above. In each diagram, the prior art is defined by the term "nocache" in the legend. The experiments were carried out using the OpenLDAP directory server (whose source code is publicly available), on a single, lightly-loaded host machine. Multiple directory servers, each with 100 entries, were created on different ports of the same host. In the prior art case (i.e., where no topology cache is used), there is a first phase during which the server that manages the base-entry-DN of the submitted LDAP query has to be located. The optimal situation in this case for the prior art approach of distributed evaluation by referrals is to hit the "right" server (i.e., the one that contains the query base) in the beginning. To ensure a fair comparison of the evaluation strategy of the present invention with the prior art approach, the experiment was configured to ensure that the query was submitted to the server that managed its base. The topology cache method of the present invention requires the fetching of the entire topology no matter where the query base is located. As discussed above, this fetching is performed only once during a session to amortize the cost of fetching the topology cache.

In the experiments, four different topology configurations were used: (1) left-deep skinny, where each server has two children servers (only one of which may have children), varying the depth of the tree from 0 (one server) to 10 (21 servers); (2) left-deep bushy, where each server has five children servers (only one of which may have children), varying the depth of the tree from 0 (one server) to four (31 servers); (3) balanced skinny, which is a complete balanced binary tree of servers, varying the depth from 0 (one server) to four (31 servers); and (4) balanced bushy, which is a complete balanced 5-ary tree of servers, varying the depth from 0 (one server) to two (31 servers). The results associated with configurations (1) and (2) are shown in FIG. 2(a), and the results associated with configurations (3) and (4) are shown in FIG. 2(b).

Since the experiment's purpose is to quantify the difference between the techniques of the prior art and the present invention, the impact of the query answer network traffic had to be controlled, since the traffic itself could mask the differences between the two techniques. Therefore, particular LDAP queries were used that were known to have no matching answers. In either case, however, the evaluation techniques would still have to search the relevant sub-topology to determine that result. Thus, the time taken for communicating the results from the server to the client can be attributed only to the distribution overheads.

Figure 2A:
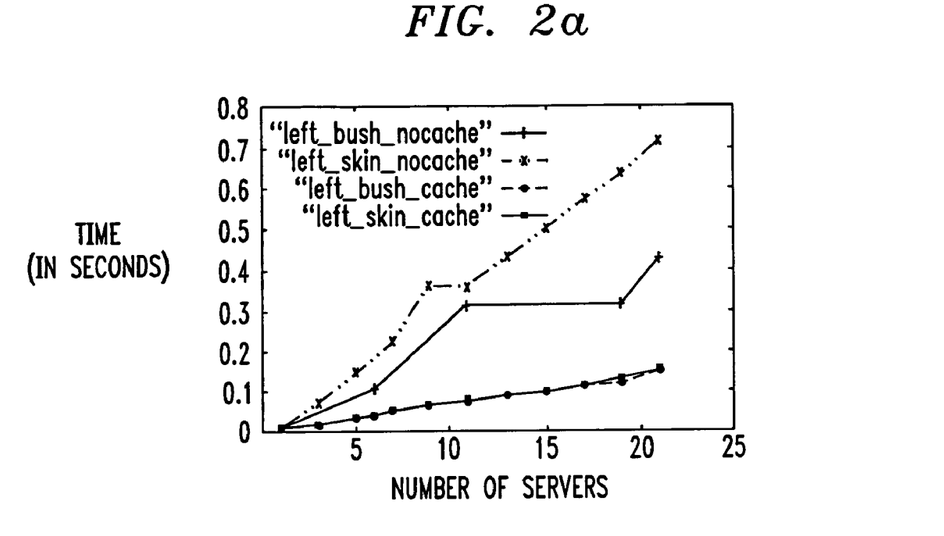
Figure 2B:
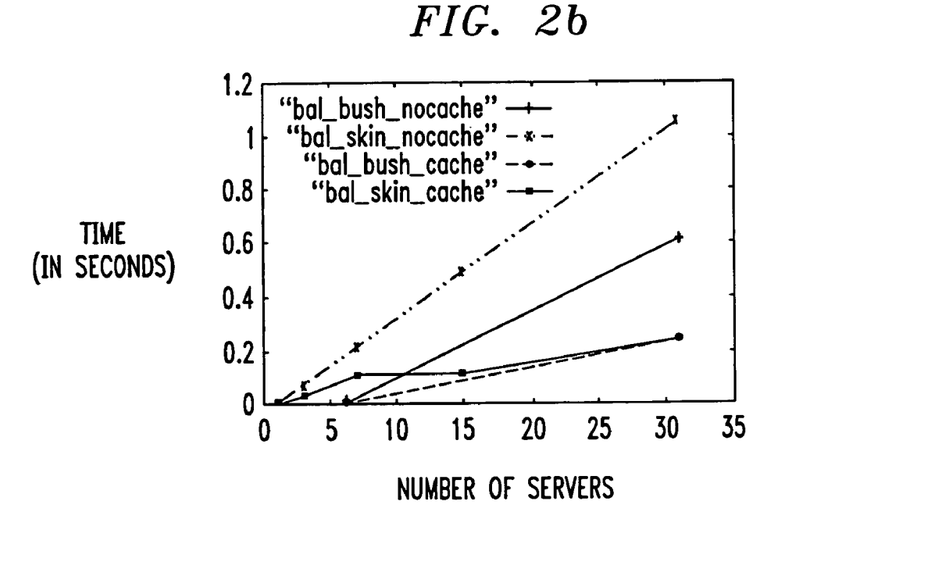

The experimental results as illustrated in FIG. 2 clearly show the benefit of using the topology cache method of the present invention, since in both FIGS. 2(a) and 2(b), the "nocache" approach curves are above the "cache" approach curves, indicating a longer time period required to respond to the query. Indeed, the benefits only increase with a larger number of servers, where this is emphasized by the fact that in both graphs the absolute value of the different between the nocache and cache curves grows linearly with the number of servers. Further, the graphs show that the "nocache" approach is highly sensitive to the distribution of the servers. That is, as the number of servers increase, the evaluation time for skinny and bushy approaches begin to diverge, demonstrating the sensitivity to the depth of the topology. In contrast, using the topology cache method of the present invention makes the evaluation cost of LDAP queries insensitive to the topology; as the number of servers increases, the evaluation times for the skinny and bushy approaches begin to converge. This is a significant measure of the robustness of the topology cache technique of the present invention.

As mentioned above, the utilization of a topology cache in performing queries in distributed directories is also useful with queries that are more complex than LDAP queries. For example, queries with multiple base-entry-DNs, hierarchical queries, and aggregate selection queries also benefit from using the topology cache methodology to generate efficient distributed plans. The utilization of the topology cache technique will be described below as used in association with a hierarchical query with multiple-base-entry DNs. The evaluation of such a query necessarily begins with a definition of distributed plans, and a method for generating the plans.

Recall that the directory client obtains the entire topology cache T at the beginning of a session. For the purposes of discussion, it is presumed that the first step is to produce a distributed query plan for evaluating a given query plan Q. The process begins with the simple observation that no matter how complex Q is, its "answer" is always a set of directory entries, each of which belongs to some directory server. In other words, the plan PQ for answering Q can be expressed as a union:

$$P_Q = Q_{S1}@S_1 \cup Q_{S2}@S_2 \cup \ldots \cup Q_{Sk}@S_k,$$

where $S_1, S_2, \ldots, S_k$ are the directory servers in the distributed directory (they can be extracted from the topology cache T), and each $Q_{Si}$ is a query identifying the contribution of server $S_i$ to the global result. The relation $P_Q$ is thus defined as the "distributed query evaluation plan" for query Q, where each element $Q_{Si}$ is defined as a separate "server query". It is to be noted that the relation $P_Q$ does not hold for SQL queries on distributed database. In that case, an answer consists of multiple records, and for each record the different components may come from different servers. This is a critical distinction, enabling the derivation of much more efficient distributed query evaluation plans than in traditional distributed relational databases.

When using a distributed query evaluation plan ($P_Q$) with relatively simple LDAP queries, the directory client sends each server query $Q_{Si}$ to its associated server $S_i$ and unions all of the results. The client needs to choose a "schedule", that is, an order in which to contact the servers. For LDAP queries, possible schedules are: send all queries in parallel, send only a limited number in parallel, or send all queries sequentially. Any schedule is a legal schedule, but, given a particular DIF, some schedules are more efficient than others.

For hierarchical and aggregate selection queries, the distributed query evaluation plan $P_Q$ still holds, but the difficulty lies in determining the definition of each server query $Q_{Si}$. Consider the following hierarchical query Q for the directory structure of FIG. 1:

Q=(d (dc=ISP, dc=com?sub?SLAPriority<=2) (dc=ISP, dc=com?sub?PVDayofWeek=6))

which has the form Q=(d Q' Q"). It is to be noted that both Q' and Q" have the same base-entry-DN, managed by server S1, as shown in FIG. 1. As discussed above, the distributed query plan $P_Q$ can be expressed as:

$$P_Q = Q_{S1}@S_1 \cup Q_{S2}@S_2 \cup Q_{S3}@S_3 \cup Q_{S4}@S_4.$$

Looking at the server queries individually, the simplest cases are for $Q_{S3}$ and $Q_{S4}$. Since S3 and S4 are leaf servers, $Q_{S3}=Q_{S4}=Q$ (but with the base-entry-DNs replaced by the corresponding partition roots), due to the nature of the "descendant" operator d. Regarding the server query $Q_{S2}$, note that server S2 has a child S3. Therefore, the answer from server S2 contains two kinds of entries: (1) entries satisfying Q' in S2, and having a descendant satisfying Q" in S3. The first set of entries can be obtained as the result of sending query Q (after modifying the base-entry-DNs to the partition root of S2) to S2, denoted as Q@S2; the second set is either empty, or can be obtained as the result of (d Q' rr3)@S2, where rr3 is defined as the subordinate referral entry in S2 pointing to S3, as shown in FIG. 1. The choice is made based on determining whether there exists some entry satisfying Q" in S3. It follows, therefore, that the server query $Q_{S2}$ for S2 has one of two forms:

$$Q_{S2} = (d\ Q'\ Q'')\ \text{or}$$
$$= (d\ Q'\ (|\ Q''\ rr3)),$$

where the choice depends on some query evaluated at S3. Indeed, both choices can be expressed concisely as:

$Q_{S2}=(d\ Q'\ (|Q''\ [\text{if (Exists}(Q''@S3))\ rr3]))$.

The expression $Q_{S2}$ is defined as a "fragment" of a distributed query evaluation plan, where (Exists Q1) is an existential query, returning a Boolean value B, while [if B Q2] is a macro construct which, based on the Boolean value B, chooses between query Q2 or Ø. It is to be noted that the macro conditional [if B Q2] needs to be evaluated first in order to generate the server query $Q_{S2}$. In this example, therefore, the distributed evaluation involves, conceptually, three steps: (1) evaluate all existential queries; (2) expand the macro conditionals to general query expressions; and (3) evaluate the server queries at the appropriate servers. In more complex examples, there can be additional steps, since existential queries may themselves contain other macro conditionals. In general, then, the distributed query evaluation plan $P_Q$ can be thought of as including conditional server queries $Q_{Si}$ of the form [if (Exists P1) Q1], where P1 is another distributed query evaluation plan and may therefore contain more conditional macros.

Figure 3:
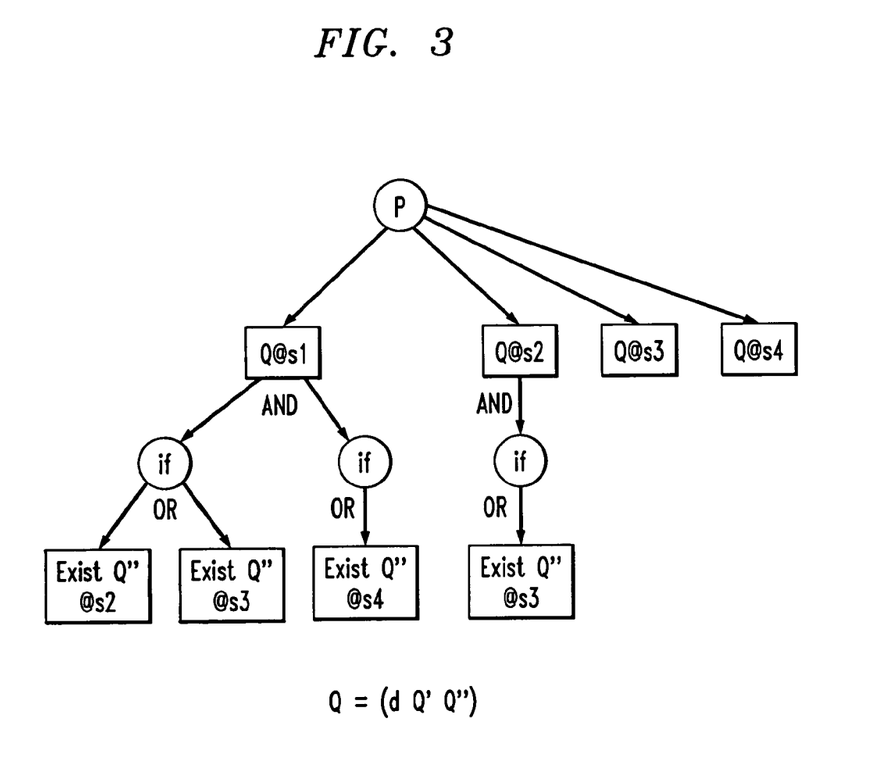
FIG. 3 illustrates the distributed query plan tree for the topology of FIG. 1.

A distributed query plan P can be diagrammed as a tree, as shown in FIG. 3(a) for the example discussed above. The distributed query plan tree PT contains nodes that correspond to each subexpression in P, where the root node in PT corresponds to the entire expression P. Non-root nodes correspond either to server queries, or to conditionals. Edges correspond to the (expression, subexpression) relationship. A fragment of the query plan tree for a more complex example is illustrated in FIG. 3(b), for the query: (d Q' (a Q' Q2')), where the expression (a Q' Q2') is represented by Q" in FIG. 3(b). There is an essential distinction between nodes corresponding to server queries and those corresponding to conditionals. In particular, each server query node is eventually sent to a directory server for evaluation, but it has to wait for all of its children to be evaluated before the server query expression can be computed. Therefore, the server query nodes can be considered as AND nodes. In contrast, conditional nodes are defined as OR nodes, and computation of the server query expression may proceed if any one of the children evaluates to TRUE.

Figure 4:
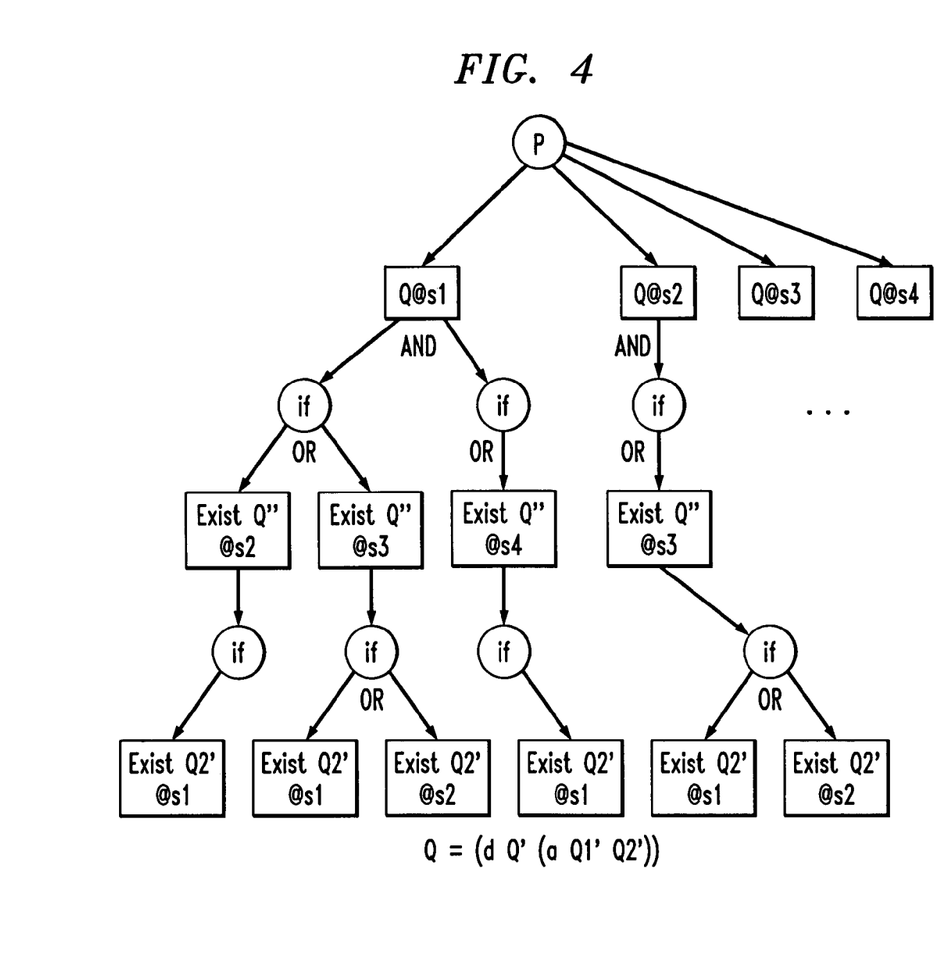
FIG. 4 illustrates an exemplary distributed query plan tree for a more complicated topology.
Figure 5:
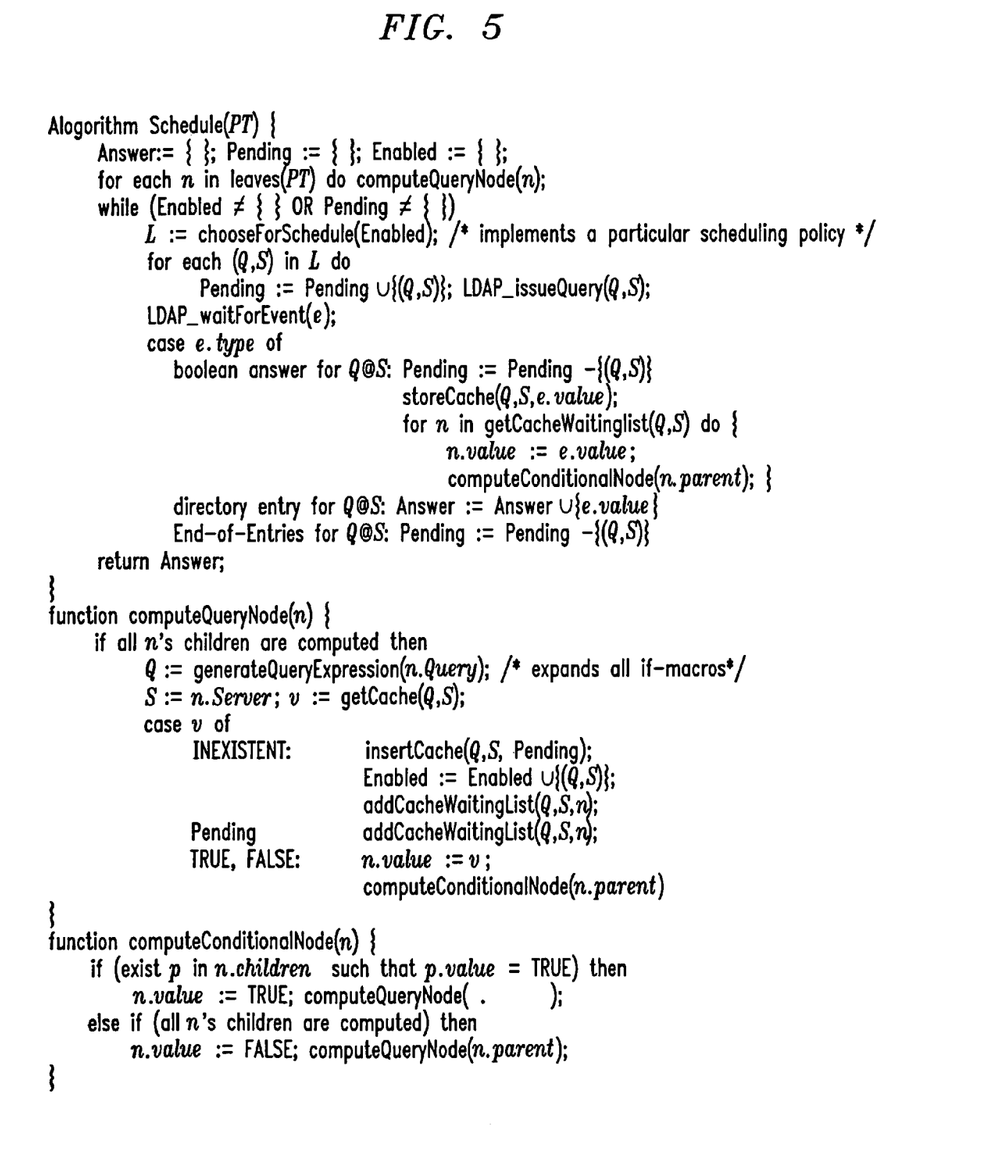
FIG. 5 lists a generic scheduling algorithm useful in determining the most efficient order in which to contact the relevant servers for a given query.

Once the plan P is generated, the directory client has to choose a "schedule", that is, an order in which to send the server queries to the individual servers. Unlike the LDAP queries discussed above, not every "hierarchical" query is legal. Indeed, a schedule for a hierarchical query is legal only if all subplans of the query are evaluated before the query. FIG. 4 contains an exemplary generic scheduling algorithm, which can be instantiated to generate a variety of specific policies.

A schedule essentially "evaluates" the plan tree PT and determines the different types of nodes within the tree. The value of the root node and its immediate children are sets of directory entries. The value of all other nodes are Boolean values: TRUE or FALSE. Values are computed in a bottom-up fashion, starting from the leaves. The main loop of the algorithm of FIG. 4 consists in issuing queries to directory servers, then waiting for result events.

The functions computeQueryNode(n) and computeConditionalNode(n) are called on the two types of nodes (server queries and conditionals), and attempt to compute the node's value. Before the computation can proceed, the child nodes beneath them must first be computed. Query nodes are AND nodes: all of their children must be computed first. Conditional nodes are OR nodes: if some child is computed and has value TRUE, then the process does not wait for the other children to complete computation; otherwise, if all children have the value FALSE, then the node has the value FALSE. In all other cases, i.e., when some of the children's values are still missing, both computeQueryNode(n) and computeConditionalNode(n) defer the computation.

The computation of the node proceeds differently for server query nodes and for conditional nodes. For conditional nodes, the value is computed immediately. For server query nodes, the query expression Q is first generated by expanding all of its "if" macros. Expansion is possible at this point, since all of the values of the Boolean conditions have been obtained. Once the expansion has been prepared, the existential query cache needs to be tested and a scheduling policy determined. With the scheduling policy in place, each separate server query $Q_{Si}$ may then be sent to its associate server Si.

The rationale behind forming an existential query cache is that multiple nodes in the plan tree PT may have the same (query, server)-pair. For example, in FIG. 4(a), there are two nodes labeled (Exists Q")@S3. Referring to FIG. 4(b), an even greater number of duplicate nodes are shown. It is to be noted that this duplication occurs for a single user query; such duplication can then be presumed to be even more significantly multiplied across a number of different queries. Thus, to avoid repeated computations, a cache of such query results can be maintained at the client. It is important to remember that only the results of existential queries can be cached, where each cache entry contains the following information: (1) the (query, server) pair (QS); (2) its value (TRUE, FALSE, or PENDING); and (3) a list of nodes in PT waiting for that result. The set of such results is thus referred to as the "existential query cache".

Once this existential query cache is determined, the scheduling policy is considered. Initially, the cache is empty, and when a pair (QS) needs to be computed, an entry with the value PENDING is created, and that creation results in the query Q being issued to server S. Subsequent results for the same pair (QS) have the effect that the corresponding node is added to the list of nodes waiting for the result of Q@S, and no query will be issued at that time. When the Boolean value of Q@S is then obtained from the server, all of the waiting nodes' values are updated and the query can be issued. In order to issue the query Q, the pair (QS) is entered in the Enabled list. As a result of the query cache, each such pair is entered in the Enabled list at most once. The function chooseFor Schedule(Enabled) selects some of the enabled queries to issue to the directory servers. This is the function that implements a particular scheduling policy. For example, a "greedy" policy returns all nodes in Enabled, and empties the list. A more conservative policy may restrict the number of concurrent requests below a certain limit (i.e., the number of outstanding requests is given by the length of Pending), and perhaps favor nodes lower in the query plan tree.

The function LDAP_issueQuery(Q,S) sends the query asynchronously to the server (that is, it does not wait for an answer). Answers are expected by the function LDAP_waitForEvent(e). The event e contains information about the (query, server) pair (Q,S) for which it was issued, as well as a result value. For Boolean queries, the result value is either TRUE or FALSE. For non-Boolean queries, the result value is one directory entry in the answer set: when that answer set has been exhausted, a special End-of-Entries value is returned.

Figure 6:
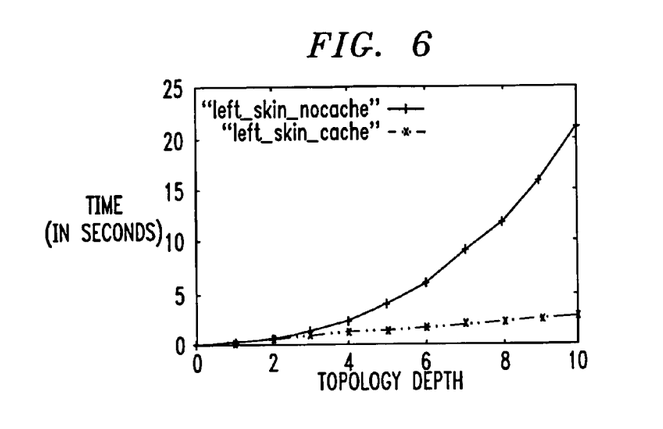
FIG. 6 is a graph illustrating the utility of an existential cache when querying a complex database structure.

The utility of an existential cache for achieving a scalable, distributed evaluation of hierarchical queries is illustrated by way of example in FIGS. 6 and 7. FIG. 7 contains a simple graph containing two curves, representing the performance of the topology cache of the present invention, with and without the use of an existential cache, as used with a hierarchical query. In generating the data for FIG. 7, the OpenLDAP server is extended to deal with hierarchical queries, using the same data sets used for the experiments described hereinabove. Since the goal of this experiment is to measure the distribution overheads of evaluating hierarchical queries (and not the performance of a stand-alone directory server for these queries), a descendant query is used, where each of its sub-queries has an answer in each directory server, but the hierarchical query as a whole has an empty result. As a consequence, the algorithms need to construct complex server queries for each non-leaf directory server in the distributed directory. The results as shown in FIG. 6 were generated for the "left-deep skinny" topology, varying the depth of the tree from 0 to 10 (the number of servers varies from 1 to 21). Without the use of the existential cache, the same query can be posed multiple times to a given server without changing the time associated with developing the answer. These two curves show the exponential nature of the "no cache" approach, as compared to the linear nature of the approach using the existential cache, as a function of the maximum path length between the server that manages the base-entry-DN of the query, and any other server that needs to be contacted.

Figure 7A:
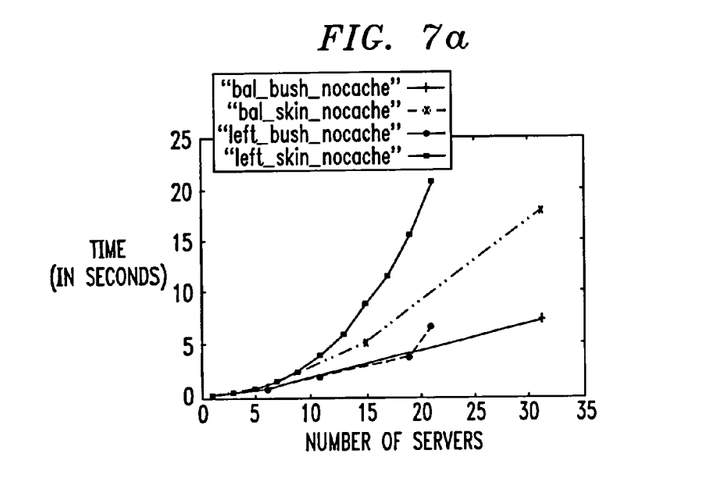
Figure 7B:
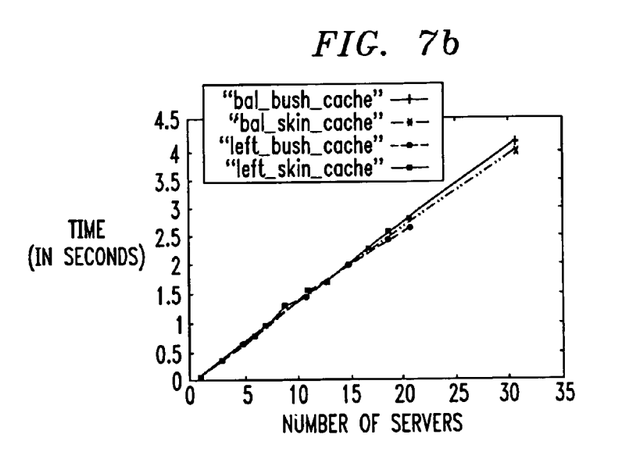

FIG. 7(a) shows the performance results related to the evaluation of the hierarchical selection query without using an existential cache. Essentially, the costs of generating and evaluating a distributed hierarchical query without using an existential cache are proportional to the total number of relevant servers in the topology, as well as exponentially dependent on the depth of the topology. FIG. 7(b) shows the performance of the same query, with the use of an existential cache for the four studied topologies. Two observations can be made from these results: (1) distributed evaluation of hierarchical queries is robust (i.e., the cost is independent of the specific topology and depends only on the number of relevant servers); and (2) the evaluation strategy is scalable with respect to the number of servers (as evident from the linear nature of the curves).

Beyond hierarchical queries, the utilization of caches can be extended to aggregate selection queries. As one example, the query Q=(d Q1 Q2 count>=20) returns all directory entries satisfying Q1 that have at least 20 descendants satisfying Q2. In order to evaluate such directory queries efficiently on a DIF, the LDAP servers need to be extended with a new query functionality: computing "aggregate-value queries". In particular, aggregate-value queries have the form (Agg Q), where Agg has the value of: count, sum, min, max or exists. An example of an aggregate-value query is: (count Q2), which returns the number of directory entries satisfying Q2. A distributed evaluation plan for this aggregate-value query on the example of FIG. 1 can thus be developed. As before, the query plan has the form of:

$$P_Q = Q_{S1}@S1 \cup Q_{S2}@S2 \cup Q_{S3}@S3 \cup Q_{S4}@S4$$

where the server query $Q_{S2}$ has to return all entries in S2 satisfying Q1, and that either have at least 20 descendants in S2 satisfying Q2, or they have x such descendants in S2, y such descendants in S3, and $x+y \geq 20$. This can be expressed concisely as:

$$Q_{S2} = (|d\ Q1\ Q2\ (count >= 20))\ (d\ (d\ Q1\ rr3)\ Q2\ (count >= [20-((count\ Q2)@S3)])) ).$$

Here, [20-((count Q2)@S3)] is a macro that results in a number, once the aggregate-value query (count Q2) is evaluated at server S3. In general, therefore, for aggregate selection queries, numeric macros need to be introduced into the query plans. Scheduling proceeds as with hierarchical and LDAP queries, except that now numeric macros are all AND nodes (i.e., all of their children have to be computed before the node's value can be determined).

In general, the use of directories as a key component of the network infrastructure, in applications such as the DEN initiative, has been shown to benefit from the efficient, distributed evaluation of hierarchical and aggregate selection queries, as discussed above. Moreover, the use of the topology cache of the present invention can quickly identify directory servers that are relevant to a query, enhancing the functionality of current day directory servers to be able to support existential and aggregate-value queries. By maintaining and taking advantage of a small existential/aggregate-value cache value at the directory client, both LDAP queries and the richer hierarchical and aggregate selection queries can be evaluated using the topology cache of the present invention, where the topology cache has been found to be both scalable and robust, in that the evaluation cost grows linearly with the number of query-relevant directory servers, and that this cost is independent of the specific topology of the servers.

What is claimed is:

1. A method of searching a query through distributed directory servers organized as a forest having a plurality of entries, each entry represented by a unique identified, comprising the steps of:
   generating a topology cache of the distributed directory servers the topology describing the forest-structured, distributed topology of the directory servers;
   storing the generated topology cache at each server;
   forming, at the client, a distributed query evaluation plan P for a given query Q, based on the topology cache T sent to the client, where $$P = Q_{S1}@S1 \cup \ldots \cup Q_{Sk}@Sk,$$

where S1 . . . , Sk are defined as relevant directory servers for query Q extracted from the topology cache T, and $Q_{S1}$ is the particular query for user with server S1; and
   upon receiving, at one server, a request from a directory client associated with that server, sending a copy of the topology cache to the client to determine the identity of each directory server capable of returning answers to the query.

2. The method as defined in claim 1 wherein the topology cache includes subordinate and superior knowledge references associated with each directory server, defining its neighboring directory servers.

3. The method as defined in claim 1 wherein the method comprises the further step of:
   generating a schedule for contacting the relevant servers included in the distributed query evaluation plan.

4. The method as defined in claim 3 wherein the query comprises an LDAP query and the scheduling step comprises contacting all relevant directory servers in parallel.

5. The method as defined in claim 3 wherein the query comprises an LDAP query and the scheduling step comprises contacting subsets of the relevant directory servers in parallel.

6. The method as defined in claim 3 wherein the query comprises an LDAP query and the scheduling step comprises contacting each relevant directory server in sequence.

7. The method as defined in claim 3 wherein the step of generating a schedule for contacting the relevant servers includes
   generating a distributed query plan tree PT, comprising
   a root node, defined as the distributed evaluation query plan P; and
   a plurality of non-root nodes comprising a first set of server query nodes QSi for relevant server Si in the topology cache T, and a second set of conditional nodes, the conditional nodes including existential queries and macro ("if") conditionals, wherein server queries are defined as AND nodes and conditional nodes are defined as OR nodes;
   evaluating said distributed query plan tree to determine the different types of nodes; and
   scheduling evaluation of conditional nodes before server query nodes.

8. The method as defined in claim 7 wherein in evaluating conditional nodes, the method further comprises the step of evaluating existential nodes prior to evaluating macro conditional nodes.

9. The method as defined in claim 8 wherein in evaluating existential nodes, the method comprises the steps of
   creating a cache of all existential nodes in a query;
   determining the answer to each existential query; and
   populating the existential query cache with the determined answers.

10. The method as defined in claim 1 wherein the query associated with the directory client comprises an LDAP query.

11. The method as defined in claim 1 wherein the query comprises an LDAP query and the distributed query evaluation plan comprises the steps of:
   sending the original query to the directory server that manages the query's base-entry-DN; and
   sending modified queries to all other relevant servers identified in the topology cache, the original query modified by replacing either the base-entry-DN, the scope, or both the base-entry-DN and the scope.

12. The method as defined in claim 1 wherein the query comprises a complex query.

13. The method as defined in claim 12 wherein the complex query comprises a hierarchical query including either multiple-base-DNs existential queries, conditional queries, or any combination thereof.

14. The method as defined in claim 12 wherein the complex query comprises an aggregate query including at least numeric macro conditionals.

15. The method as defined in claim 1 wherein the step of forming a distributed query evaluation comprises the step of generating a distributed query plan tree PT, comprising
   a root node, defined as the distributed evaluation query plan P; and
   a plurality of non-root nodes comprising a first set of server query nodes QSi for relevant server Si in the topology cache T, and a second set of conditional nodes, the conditional nodes including existential queries and macro ("if") conditionals, wherein server que ries are defined as AND nodes and conditional nodes are defined as OR nodes.

16. The method as defined in claim 15 wherein in evaluating the query plan tree, the following steps are used:
   a) evaluating all existential queries at the conditional nodes;
   b) expanding all macro conditionals to general query expressions; and
   c) evaluating the server query nodes.

\* \* \* \* \*